L. KATZ.
CLUTCH PEDAL LOCK.
APPLICATION FILED DEC. 6, 1918.

1,322,244.

Patented Nov. 18, 1919.

Inventor
Louis Katz
By Strong & Townsend
Attorneys

UNITED STATES PATENT OFFICE.

LOUIS KATZ, OF SAN FRANCISCO, CALIFORNIA.

CLUTCH-PEDAL LOCK.

1,322,244.  Specification of Letters Patent.  Patented Nov. 18, 1919.

Application filed December 6, 1918. Serial No. 265,483.

*To all whom it may concern:*

Be it known that I, LOUIS KATZ, a citizen of the United States, residing at the city and county of San Francisco and State of California, have invented new and useful Improvements in Clutch-Pedal Locks, of which the following is a specification.

This invention relates to a pedal lock to be used in connection with the speed changing clutch of a planetary transmission for motor vehicles and the like, and is more particularly designed for use on the Ford type of automobiles.

One of the objects of the present invention is to provide means operable in conjunction with the clutch pedal and independently of the emergency brake for locking the clutch in low gear or in neutral position. Another object of the invention is to provide a simple, cheaply manufactured device of the character described, which may be readily applied in a motor vehicle of the type referred to at relatively small cost, and without changing any of the existing mechanism. Further objects will hereinafter appear.

The invention consists of the parts and the construction and arrangement of parts as hereinafter more fully described and claimed, having reference to the accompanying drawings, in which—

Figure 1:
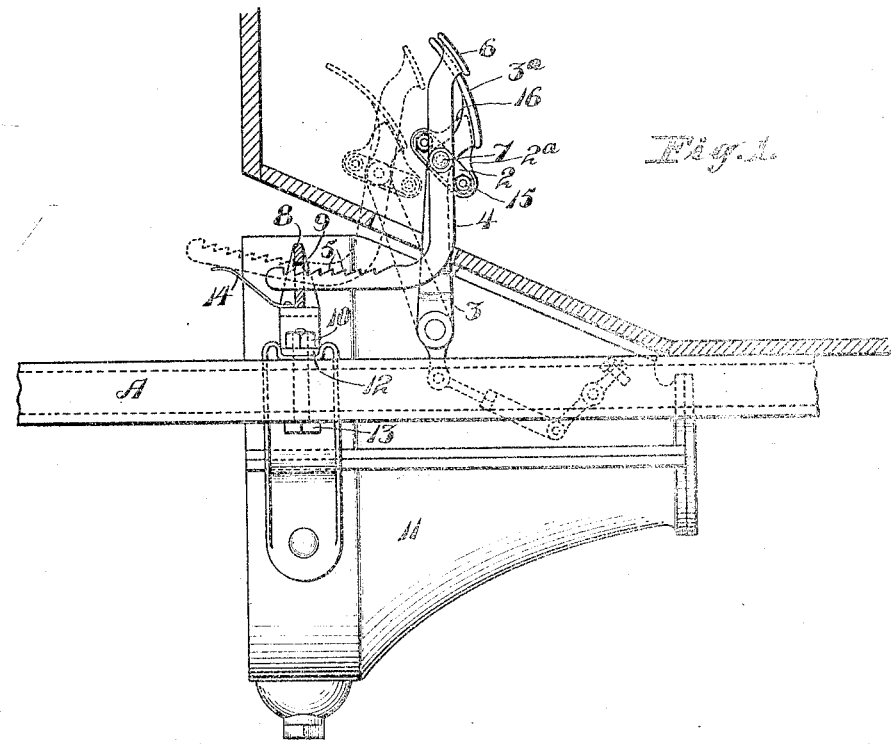
Figure 1 is a side elevation of the transmission case on a Ford automobile showing the application of the invention.
Figure 2:
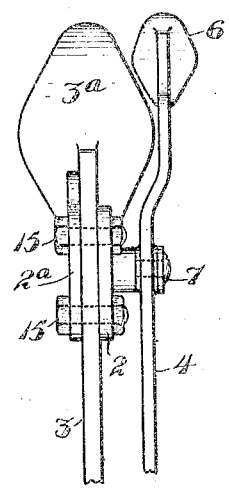
Fig. 2 is an end view of the clutch pedal showing the position of the locking pedal.
Figure 3:
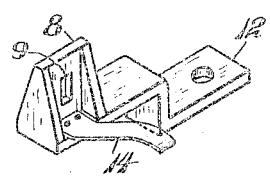
Fig. 3 is a perspective view of the slotted locking plate.

In automobiles such as the Ford, which employs a planetary transmission gear, it is necessary to depress the clutch pedal or move it in a forward direction to engage the low speed gear. When the pedal is pressed half way forward the gears are in neutral (*i. e.* disconnected from the driving mechanism of the rear wheels), and, with a hand lever thrown forward, the releasing of this pedal engages the high speed clutch.

The planetary transmission gear being so well known requires no description. It is sufficient to say that a strong spring in the transmission gear pulls backward on the pedal causing the engagement of the high speed clutch.

The low gear is used when the car is first started in motion, or when for any reason the load is so heavy that the use of the low gear is necessary; for instance, when going up a hill. In order to keep the low gear in engagement it is necessary to press forward on the clutch pedal and to keep the same in the extreme forward position in opposition to the action of the spring in the transmission gear previously referred to. Holding the foot on the pedal for any length of time, when traveling in hilly or mountainous country, is very tiring to the driver. This causes the driver at times to unintentionally release the pedal, thus causing the low gear transmission band to slip and get hot owing to the occasional release of the clutch pedal.

The purpose of the present invention is to overcome this difficulty by providing means for positively locking the clutch pedal in the extreme forward position when the low gear drive is required. This is accomplished in the following manner: Secured by means of a bracket generally indicated at 2 on the clutch pedal 3 is a bell-crank-shaped rack arm 4, on one end of which is formed a series of teeth 5 while the opposite end is provided with a foot plate 6. The bell-crank arm is pivotally secured as at 7 to the bracket 2. It may therefore be rocked on said pivotal connection to bring the teeth 5 into or out of engagement with a locking plate 8. This plate is slotted as at 9 to permit the end of the lever to pass therethrough and it is secured to the main frame "A" of the motor by means of a nut 10. This nut is also used for the purpose of securing the transmission case 11 to the main frame of the car. It is, therefore, only necessary to remove said nut and to place the perforated base end 12 of the member 8 over the threaded end of the bolt 13. The nut 10 may then be applied, thus securing member 8, and also the transmission case. The member 8 also serves the function of supporting a spring 14. This spring normally engages the toothed end of the lever 4, thereby retaining the teeth 5 in engagement with the plate 8, or the upper end of the slot 9. The bracket 2 supporting the lever 4 is made in two sections: 2 and 2ª. These sections are secured together by means of bolts 15, and as one bracket section is mounted on one side of the clutch pedal 3, and the other bracket section 2 on the opposite side, it can readily be seen that the application of the bolts will permit the bracket sections to be rigidly secured. For the purpose of maintaining a fixed distance between the foot plate 3ª on the clutch pedal and the pivot point 7 a lug or gage member 16 has been formed on one of the bracket sections. This lug engages the underside of the foot plate 3ª, and thereby serves as a gage between the foot plate and the bracket, which determines the exact position of the bracket, and furthermore serves as a stop to prevent the bracket from having any tendency to rock or change its position on the pedal arm 3. The opposite bracket section, for instance 2, is provided with an extending boss, and the lever 4 is pivotally attached at 7 to the boss in a suitable manner.

A Ford automobile thus equipped is operated in the usual manner. When starting it is only necessary to place the foot on the foot plate 3ª and rock the pedal 3 to its extreme forward position, where the low gear is engaged. It is here automatically locked against return movement, as the spring 14 holds the teeth of the lever 4 in engagement with the locking plate 8. The operator or driver of the car may therefore release the pedal if he so desires, particularly if any hill is encountered. The clutch pedal thus locked cannot be released until the foot plate 6 is depressed. This causes the lever 4 to swing about the pivotal connection 7, thus swinging the pedal out of engagement with the locking plate 8 to a position where the clutch pedal may move freely in a rearward direction. On the return movement of the clutch pedal it is possible to lock the same in neutral position if desired by merely releasing the foot plate 6. This release of the foot plate causes the spring 14 to lift the lower end of the lever into engagement with the lock plate. The teeth will thus engage the same and lock the clutch pedal in neutral position. If it is desired to move from neutral to high, it is only necessary to depress the foot plate 6. This causes the lever 4 to release itself, and the clutch pedal may therefore be returned to direct driving position.

One of the main features of the present invention is the fact that it may be applied to any Ford car without altering the present mechanism or disturbing the adjustments of any of the parts. This is due to the fact that the two piece bracket 2 is clamped directly on the arm of the present clutch pedal, and secondly, because the locking plate 8 may be secured in position by the nut 10, which is already employed for the purpose of securing the transmission case. It is, therefore, possible for any one, whether a skilled mechanic or otherwise, to apply the device, and it it also possible to make said application with a comparatively small loss of time, as it is only necessary to remove the nut 10 to secure the locking plate 8, and then to apply nuts 15 to secure the bracket 2 in place. The device as a whole is small and substantial in construction, and is cheap to manufacture, and as it automatically locks itself when the clutch pedal is depressed, it can readily be seen that it can be advantageously employed particularly in a hilly country, as it relieves the driver, not only of the unnecessary muscular exertion, but it also relieves him of any responsibility or care while driving under the conditions just mentioned.

The materials and finish of the several parts employed may be such as the experience and judgment of the manufacturer may dictate, and I wish it understood that various changes in form proportion and minor details of construction may be resorted to within the scope of the appended claims, and that I do not wish to limit myself to the specific design and construction here shown.

Having thus described my invention, what I claim and desire to secure by Letters Patent is:

1. The combination with the clutch pedal on a planetary transmission gear and the foot plate on said pedal of a bracket adapted to be secured to the pedal, a lug on said bracket engaging the under face of the foot plate to maintain a fixed distance between the foot plate and the bracket, a lever pivotally mounted on said bracket, said lever having a foot plate formed on one end and a series of rack teeth on the opposite end, a slotted plate through which the toothed end of the lever extends and a spring on said plate adapted to maintain the teeth in engagement with the plate, said spring being located so as to only engage the lever in certain positions of the latter.

2. In combination with the clutch pedal of a motor vehicle, a foot lever of substantially L-shape pivoted to said pedal and having upwardly facing teeth on one end, latching means to engage the teeth, and spring means which is out of engagement with the lever when the latter is inoperative and which upon certain movements of the lever engages the latter to cause same to engage the latching means.

3. The combination with the clutch pedal on a planetary transmission gear and a foot plate on said pedal, of a bracket adapted to be secured to the pedal, a lever pivotally mounted on said bracket having a series of teeth formed on one end and a foot plate on the opposite end, means on the bracket for maintaining a fixed distance between the foot plate on the clutch pedal and the pivotal point on the lever, a slotted locking plate through which the toothed end of the lever is adapted to pass, and a spring secured to the plate and engageable with the lever only in certain positions of the latter to automatically maintain the lever in a position where the teeth will interlock with the plate.

4. In combination with a clutch pedal, a foot lever carried thereby, latching means for the lever, and means disengaged from the lever when the latter is inoperative and upon predetermined movement of the lever acting to move the lever into engagement with the latching means.

5. In combination with a clutch pedal, a foot lever carried thereby and having upwardly facing teeth, means to engage the teeth to latch the lever, and a spring means acting beneath the lever and disposed so as to permit the teeth to lie out of engagement with the latching means in certain positions of the lever and upon predetermined movement of the lever to move the latter to effect engagement of the teeth with the latching means.

6. In combination with the clutch pedal of a motor vehicle, a foot lever carried by the pedal and having upwardly facing teeth, latching means to engage the teeth, and a flat spring engageable beneath the lever and being formed and located so as to be disengaged from the lever in a certain position of the latter to enable the teeth to be disengaged from the latching means and upon predetermined movement of the lever to move the latter so that its teeth engage the latching means.

In testimony whereof I have hereunto set my hand in the presence of two subscribing witnesses.

LOUIS KATZ.

Witnesses:
JOHN H. HERRING,
W. W. HEALEY.